United States Patent Office 3,096,859
Patented July 9, 1963

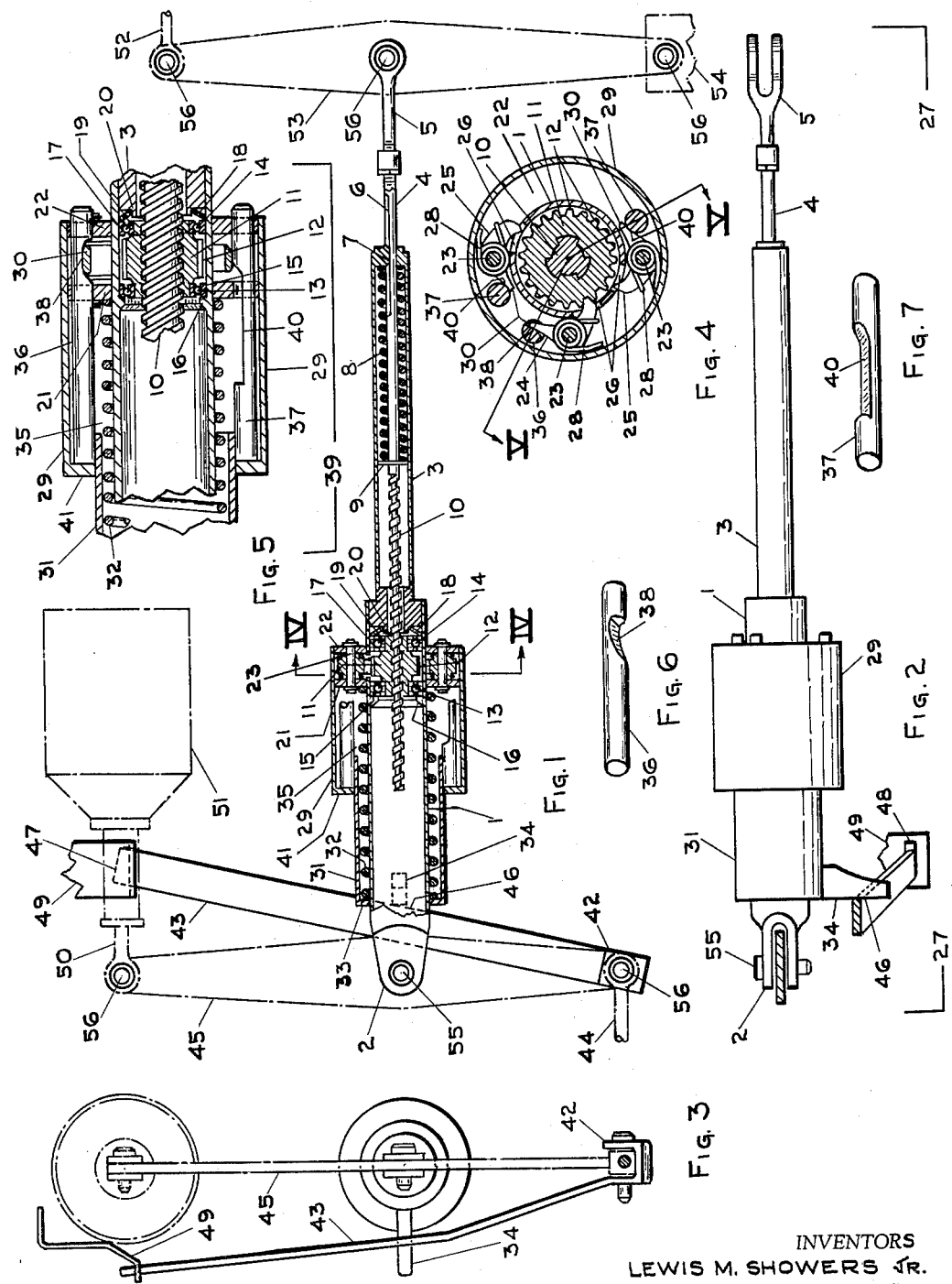

3,096,859
DOUBLE ACTING SLACK ADJUSTER
Lewis M. Showers, Jr., 104 E. Essex Ave., Lansdowne, Pa., and Charles T. Biscardi, E. Mill Road, Maple Shade, N.J.
Filed Aug. 13, 1962, Ser. No. 216,557
3 Claims. (Cl. 188—196)

This invention pertains to a device for automatically adjusting a brake system and more particularly a brake system such as used for railroad freight car brakes.

One object of this invention is to provide a device which will automatically maintain a predetermined brake cylinder push rod travel by compensating for wear of brake shoes etc. at each brake application.

It is a further object of this invention to automatically adjust, at the first brake application, for any new brake shoes which may have been inserted in the brake system to replace worn shoes.

This invention is believed to be superior in operation to any previous slack adjusters, in that it combines small increments of adjustment with complete adjustment at each application of brakes.

Still additional objects, benefits and advantages of this invention will be evident from a study of the following description taken in conjunction with the accompanying drawing, in which;

FIGURE 1 is a sectional plan view.
FIGURE 2 is a side elevation.
FIGURE 3 is an end view.
FIGURE 4 is an enlarged sectional view taken along lines IV—IV of FIGURE 1.
FIGURE 5 is a sectional view taken along lines V—V of FIGURE 4.
FIGURE 6 is a perspective view of ratchet dog cam finger 36.
FIGURE 7 is a perspective view of ratchet dog cam finger 37.

Referring now specifically to the drawing, a double acting slack adjuster made in accordance with the present invention is shown to include a ratchet spin-nut housing 1, FIG. 1, having a brake jaw 2 at one end and provided with a removable take-up spring housing 3 at the other end.

Extending longitudinally through take-up spring housing 3 is a brake adjusting rod 4, the one end of which extends a suitable distance outside of take-up spring housing 3 and is provided with a removable rod jaw 5. Brake adjusting rod 4 is prevented from rotating relative to take-up spring housing 3 by longitudinal keyway 6 and 7 in take-up spring housing 3.

Take-up spring 8 surrounding brake adjusting rod 4 is a compression spring between the end of take up spring housing 3 and washer 9 which is shouldered on brake adjusting rod 4.

The end of brake adjusting rod 4, extending a suitable distance inside of ratchet spin-nut housing 1, is provided with a multiple thread 10 the helix angle of which is such that matching ratchet spin-nut 11 will rotate readily, when not restrained, as brake adjusting rod 4 is moved, without rotation, in or out of ratchet spin-nut 11.

Ratchet spin-nut 11 is provided with suitable longitudinal ratchet teeth 12 and is mounted on suitable antifriction combined radial and thrust bearings 13 and 14.

Outer race 15 of antifriction bearing 13 abuts shoulder 16 in ratchet spin-nut housing 1 to take the thrust lead in one direction, and to take the thrust load in the other direction outer race 17 of antifriction bearing 14 contacts dished spring washer 18 to take care of minor thrust loads. Deflection of dished spring washer 18 allows inner race 19 of antifriction bearing 14 to contact cylindrical projection 20 of take-up spring housing 3 to resist any major thrsut load.

Ratchet dog mounting rings 21 and 22 surround and project outward from the outside surface of ratchet spin-nut housing 1 and are equal distance from and parallel to the perpendicular center line of ratchet spin-nut 11.

Mounted on pins 23, FIG. 4, which pass through and are supported by ratchet dog mounting rings 21 and 22, FIG. 1, is a plurality of ratchet dogs 24 and 25, FIG. 4. Ratchet dog 24, when engaged with ratchet teeth 12 of ratchet spin-nut 11 through hole 26 in ratchet spin-nut housing 1, is arranged so as to oppose the rotation of ratchet spin-nut 11 in the direction that would shorten double acting slack adjuster 27, FIG. 2. Ratchet dogs 25, FIG. 4, when engaged with ratchet teeth 12 of ratchet spin-nut 11 through holes 26 in ratchet spin-nut housing 1, are arranged so as to oppose the rotation of ratchet spin-nut 11 in the direction that would lengthen double acting slack adjuster 27, FIG. 2.

Ratchet dogs 24 and 25, FIG. 4, are held in engagement with ratchet teeth 12 of ratchet spin-nut 11 by suitable dog spring 28. The reaction of dog springs 28 is taken by ratchet cover 29. Ratchet dogs 24 and 25 are provided with a cam follower surface projection 30.

Cam finger return spring housing 31, FIG. 1, surrounding a portion of ratchet spin-nut housing 1, confines a cam finger return spring 32 between an inwardly projecting ring shoulder 33 and ratchet dog mounting ring 21. Extending downward from cam finger return spring housing 31 is a command trigger 34, FIG. 2. The space 35, FIG. 1, between the end of cam finger return spring housing 31 and ratchet dog mounting ring 21 must provide sufficient travel of cam finger return spring housing 31 to accommodate full travel available at brake cylinder push rod 50.

Attached to and suitably located parallel to the axis of cam finger return spring housing 31, FIGS. 4 and 5, is a plurality of ratchet dog cam fingers 36 and 37 extending through ratchet dog mounting rings 21 and 22, FIG. 5.

Ratchet dog cam finger 36, FIG. 6, is provided with a cam surface 38 suitably proportioned and located so as to disengage ratchet dog 24, FIG. 4, from ratchet teeth 12 of ratchet spin-nut 11 by a design movement of ratchet dog operating unit 39, FIG. 5, composed of 31, 32, 35, 36, 37, 38 and 40 also 33, FIG. 1. Ratchet dog cam fingers 37, FIG. 7, are provided with a cam surface 40 suitably proportioned and located so as to engage ratchet dogs 25, FIG. 4, with ratchet teeth 12 of ratchet spin-nut 11 synchronized to operate with approximately the same design movement of ratchet dog operating unit 39, FIG. 5.

Surrounding and attached to ratchet dog mounting rings 21 and 22, FIG. 5, is a ratchet cover 29 which extends to include the ratchet dog fingers 36 and 37, the end having an inwardly projecting ring shoulder 41, FIG.

1, which limits the travel of ratchet dog operating unit 39, FIG. 5, at the return position.

For the installation of a double acting slack adjuster 27, FIG. 2, to a brake system, as shown by dashed lines, FIG. 1, the one end 42 of command lever 43 is pivotally mounted at the pull rod end 44 of the cylinder lever 45 on a plane which will swing surface 46 of command lever 44 into contact with command trigger 34, FIG. 3. The other end 47, FIG. 1, of command lever 43 is inserted in a slot 48, FIG. 2, of car frame anchor 49 which is located to provide the required travel of cylinder push rod 50, FIG. 1.

The other components of the brake system shown by dashed lines are brake cylinder 51, FIG. 1, truck pull rod 52, floating lever 53, floating lever anchor 54, and brake pins 56.

In describing the operation of this invention it will be assumed that it has been properly installed in a brake system similar to the one shown by dashed lines, FIG. 1.

With the brakes in the released position cam finger spring 32 has returned ratchet dog operating unit 39, FIG. 5, to its brakes released position with the ends of ratchet dog cam fingers 36 and 37 contacting inward projecting ring shoulder 41. In this position cam surface 38, FIG. 4, of ratchet dog cam finger 36 has engaged ratchet dog 24 with ratchet teeth 12 of ratchet spin-nut 11, thus preventing the shortening of the double acting slack adjuster 27, FIG. 2, under the influence of take up spring 8, FIG. 1, also cam surface 40 of ratchet cam fingers 37 has disengaged ratchet dogs 25 from ratchet teeth 12 of ratchet spin-nut 11.

When a brake application is made, push rod 50, FIG. 1, is forced outward by air pressure in brake cylinder 51. Since the one end 42 of command lever 43 is pivotally mounted on rod end 44 of cylinder lever 45 and the other end 47 of command lever 43 is restrained by car frame anchor 49 these levers 43 and 45 will separate angularly around rod end 44. The housing jaw 2 of double acting slack adjuster 27, FIG. 2, being pivotally attached to, and near the center of, cylinder lever 45, FIG. 1, by brake pin 55, will effect the angular movement of cylinder lever 45 relative to command lever 43 to cause surface 46 of command lever 43 to depress command trigger 34. If lengthening of double acting slack adjuster 27, FIG. 2, is required, such as when new brake shoes have been installed in the brake system, this takes place during the travel of push rod 50, FIG. 1, prior to the depression of command trigger 34.

The lengthening of the double acting slack adjuster 27, FIG. 2, is accomplished by the resistance of the brake system shown in dashed lines, FIG. 1, overcoming the tension of take-up spring 8 and moving brake adjusting rod 4 outwardly from take-up spring housing 3. This movement rotates ratchet spin-nut 11 on antifriction bearings 13 and 14 by means of multiple thread 10 without overcoming tension of dished spring washer 18. Since ratchet dogs 25, FIG 4, are disengaged, ratchet spin-nut 11 is free to rotate in the lengthening direction resisted only by ratchet action of ratchet dog 24 held in engagement by dog springs 28.

If shortening action of double acting slack adjuster 27, FIG. 2, is required, such as compensation for wear of brake shoes, the depression of command trigger 34 by surface 46 of command lever 43 moves ratchet dog operating unit 39, FIG. 5, by overcoming tension of cam finger return spring 32, FIG. 1. This movement causes ratchet dog cam finger 36, FIG. 4, to disengage ratchet dog 24 from ratchet teeth 12 on ratchet spin-nut 11 by means of cam surface 38 of ratchet dog cam finger 36 and cam surface projection 30 of ratchet dog 24. With ratchet dog 24 disengaged take-up spring 8, FIG. 1, quickly pulls up any slack in brake rigging by withdrawing brake adjusting rod 4 into take-up spring housing 3 thus rotating ratchet spin-nut 11 on antifriction bearings 13 and 14 by means of multiple thread 10.

The same movement of ratchet dog operating unit 39, FIG. 5, causes ratchet dog cam fingers 37, FIG. 4, to engage ratchet dogs 25 with ratchet teeth 12 on ratchet spin-nut 11 by means of cam surface 40 of ratchet dog cam fingers 37 and cam surface projection 30 of ratchet dogs 25 allowing dog springs 28 to move ratchet dogs 25 to the engaged position.

With ratchet dogs 25 in the engaged position with ratchet teeth 12, ratchet spin-nut 11, FIG. 1, is locked against rotation in the lengthening direction. Further movement of push rod 50 increases tension in the brake system.

To prevent overloading antifriction radial and thrust bearing 14, FIG. 5, dished spring washer 18 is inserted between outer race 17 of antifriction radial and thrust bearing 14 and take up spring housing 3. Deflection of dished spring washer 18 abuts ratchet spin nut 11 and inner race 19 with cylindrical projection 20 of take up spring housing 3 to provide a solid stop for brake application loads.

Since all operations of the double acting slack adjuster 27, FIG. 2, are syncronized to the relative movement of the command lever 43, FIG. 1, it follows that the location of the car frame anchor 49 will determined the length of stroke of cylinder push rod 50.

Having thus described our invention we claim:

1. A double acting slack adjuster for a brake linkage to resist tension loads, in combination, a brake adjusting rod having a removable jaw on one end and a multiple thread on the other end, a take-up spring and washer surrounding said rod, a longitudinal keyway at said jaw end of said rod, a ratchet spin-nut threaded on said rod, antifriction bearings supporting said ratchet spin-nut, a ratchet spin-nut housing having a jaw at one end, a take-up spring housing removably attached to the other end of said spin-nut housing, a key in said take-up spring housing slidably matching said keyway in said brake adjusting rod, a dished washer between said antifriction bearing and the other end of said take-up spring housing, a plurality of ratchet dogs pivotally mounted on the ratchet spin-nut housing and alternately engageable with said ratchet spin-nut, a command finger return spring housing slidably mounted on said ratchet spin-nut housing, a plurality of oppositely acting ratchet dog command fingers secured to said command finger return spring housing for alternately engaging and disengaging said ratchet dogs, a ratchet cover for said ratchet dogs having springs biasing the ratchet dogs into engagement with the ratchet spin-nut, a command trigger secured to said cam finger return spring housing, a command lever adapted to be secured to the brake linkage and engageable with the command trigger for actuation of the command finger return spring housing during normal and overtravel brake applications.

2. A double acting slack adjuster for a brake linkage to resist tension loads, as set forth in claim 1, in which said ratchet dog cam fingers have cam surfaces which are synchronized for the engagement of said ratchet dogs.

3. A double acting slack adjuster for a brake linkage to resist tension loads, in combination, a brake adjusting rod having a removable jaw on one end and a multiple thread on the other end, a take-up spring and washer surrounding said rod, a longitudinal keyway at said jaw end of said rod, a ratchet spin-nut threaded on said rod, antifriction bearings supporting said ratchet spin-nut, a ratchet spin-nut housing having a jaw at one end, a take-up spring housing removably attached to the other end of said spin-nut housing, a key in said take-up spring housing slidably matching said keyway in said brake adjusting rod, a dished washer between said antifriction bearing and the other end of said take-up spring housing, a plurality of ratchet dogs pivotally mounted on the ratchet spin-nut housing and alternately engageable with said ratchet spin-nut, a command finger return spring housing slidably mounted on said ratchet spin-nut housing, a plurality of oppositely acting ratchet dog command fingers secured to said command finger return spring housing for alternately engaging and disengaging said ratchet dogs, a ratchet cover for said ratchet dogs having springs biasing the ratchet dogs into engagement with the ratchet spin-nut, a command trigger secured to said cam finger return spring housing, a command lever adapted to be secured to the brake linkage and engageable with the command trigger for actuation of the command finger return spring housing during normal and overtravel brake application, in which said ratchet spin-nut is provided with ratchet teeth for engagement with said ratchet dogs as a means of holding the adjustment of said brake adjusting rod.

References Cited in the file of this patent

UNITED STATES PATENTS

| | | |
|---|---|---|
| 1,837,473 | Neven | Dec. 22, 1931 |
| 2,973,841 | McClure et al. | Mar. 7, 1961 |